United States Patent
Hsu

(10) Patent No.: US 8,358,842 B2
(45) Date of Patent: Jan. 22, 2013

(54) ELECTRONIC DEVICE WITH FUNCTION OF SEPARATING PANELS OF DIGITAL COMIC STRIP AND METHOD THEREOF

(75) Inventor: Ting-Yu Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 135 days.

(21) Appl. No.: 13/097,078

(22) Filed: Apr. 29, 2011

(65) Prior Publication Data

US 2012/0251001 A1    Oct. 4, 2012

(30) Foreign Application Priority Data

Apr. 1, 2011    (CN) .......................... 2011 1 0082593

(51) Int. Cl.
*G06K 9/34* (2006.01)

(52) U.S. Cl. ....................................................... 382/173
(58) Field of Classification Search .......... 382/173–180; 715/723, 730–732, 764; 345/418, 473, 467; 463/1; 455/566

See application file for complete search history.

(56) References Cited

U.S. PATENT DOCUMENTS

| | | | |
|---|---|---|---|
| 6,232,966 B1 * | 5/2001 | Kurlander | 715/764 |
| 6,826,417 B2 * | 11/2004 | Seignol et al. | 455/566 |
| 8,243,076 B2 * | 8/2012 | Goodinson | 345/467 |
| 2008/0039163 A1 * | 2/2008 | Eronen et al. | 463/1 |
| 2011/0310104 A1 * | 12/2011 | Dicke | 345/473 |
| 2012/0131463 A1 * | 5/2012 | Lefler | 715/730 |

\* cited by examiner

*Primary Examiner* — Ishrat I Sherali
(74) *Attorney, Agent, or Firm* — Altis Law Group, Inc.

(57) ABSTRACT

An electronic device with a function of separating panels from a comic strip includes an input unit, a storage unit for storing comic strips, and a processing unit. Each comic strip includes a frame, a number of panels within the frame, and a number of borders separating the panels. The processing unit includes a comic strip acquiring module, a frame identifying module, a border identifying module, a panel separating module and a sorting module. The comic strip acquiring module acquires a comic strip. The frame identifying module identifies the frame. The border identifying module identifies whether there are first borders around the panels within the identified frame. The panel separating module separates the number of panels from the acquired comic strip according to the identified first borders. The sorting module sorts the panels.

12 Claims, 4 Drawing Sheets

ELECTRONIC DEVICE WITH FUNCTION OF SEPARATING PANELS OF DIGITAL COMIC STRIP AND METHOD THEREOF

BACKGROUND

1. Technical Field

The present disclosure relates to electronic devices and, particularly, to an electronic device with a function of separating panels of digital comic strips and a method thereof.

2. Description of Related Art

Comic strips are popularly viewed on electronic devices such as computers and smart phones. Some readers may like to edit some strips to share portions with others, for example. However, isolating an individual panel in a strip is not possible or at least difficult with most devices.

Therefore, what is needed is an electronic device with a function of separating panels of comic strips to overcome the described limitations.

DETAILED DESCRIPTION

Figure 1:
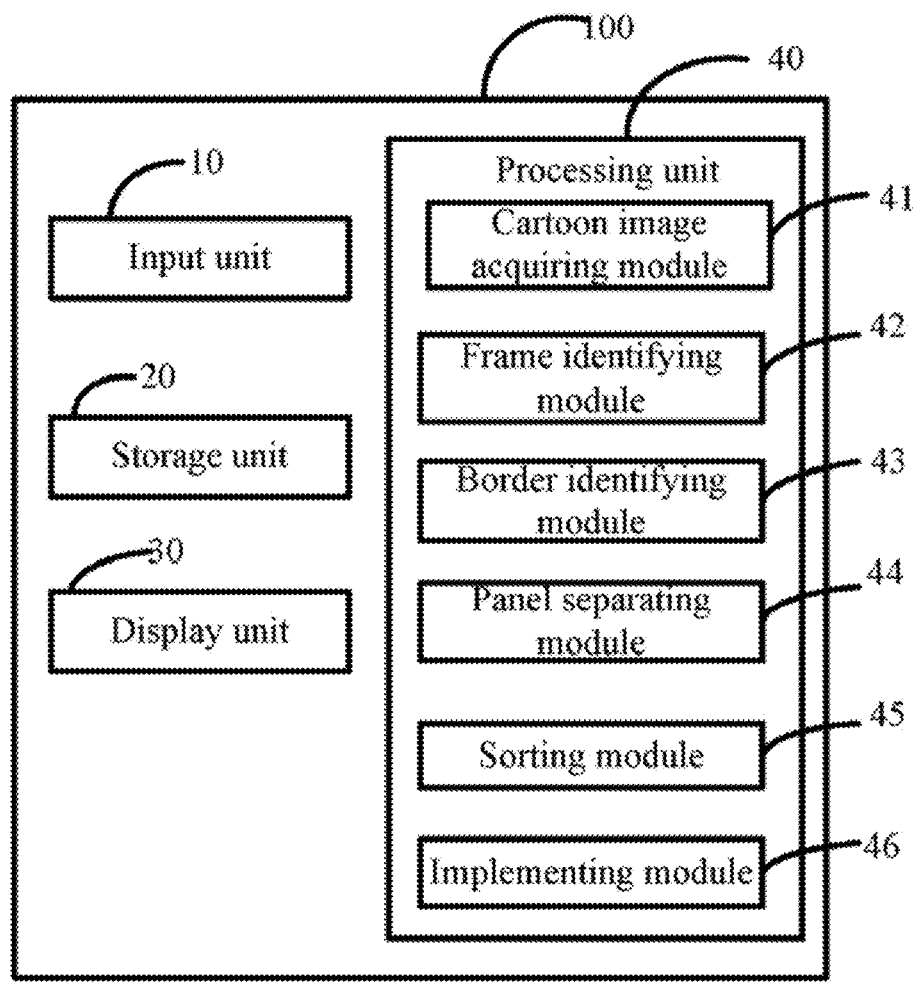
FIG. 1 is a block diagram of a hardware infrastructure of an electronic device with a function of separating panels of comic strips in accordance with an exemplary embodiment.
Figure 2:
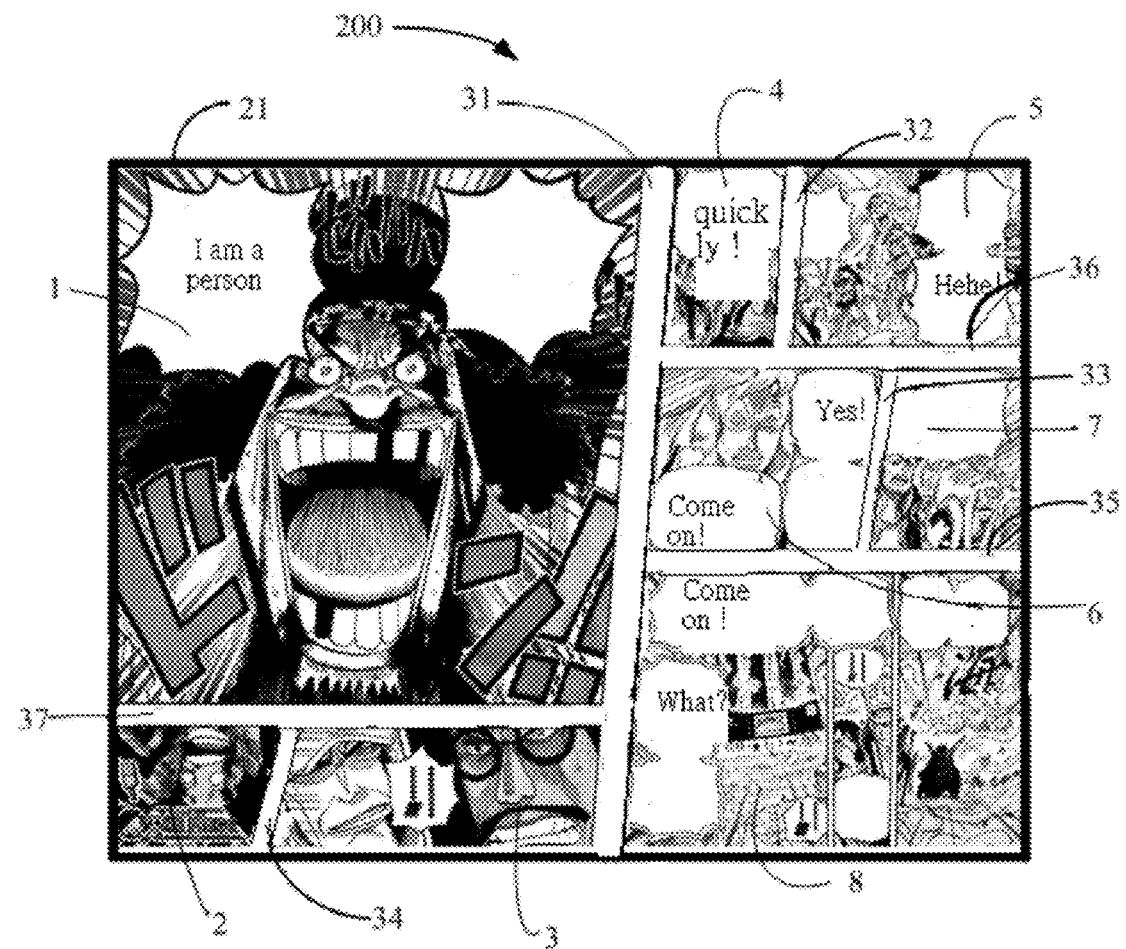
FIG. 2 shows a single viewable frame containing several panels of a comic strip.

Referring to FIGS. 1-2, an electronic device 1 with a function of separating panels of comic strips is provided. The electronic device 1 includes an input unit 10, a display unit 30, a storage unit 20, and a processing unit 40. The input unit 10 is configured for receiving user input. The storage unit 20 is configured for storing a number of comic strips. Each comic strip includes a frame, a number of panels within the frame of the comic strip, and a number of borders separating the panels. For example, as shown in FIG. 2, a comic strip 200 displayed on the display unit 30 includes a frame 21, eight panels 1, 2, 3, 4, 5, 6, 7, and 8, and seven borders 37, 34, 31, 32, 36, 33, and 35.

The processing unit 40 includes a comic strip acquiring module 41, a frame identifying module 42, a border identifying module 43, a panel separating module 44, and a sorting module 45.

The comic strip acquiring module 41 is configured for acquiring a comic strip 200 from the storage unit 20 in response to the received user input from the input unit 10, and displaying the acquired comic strip 200 on the display unit 30.

The frame identifying module 42 is configured for identifying the frame of the acquired comic strip. In one embodiment, the frame identifying module 42 identifies the frame 21 of the acquired comic strip via Sobel operator. In other embodiments, the frame identifying module 42 can identify the frame 21 of the acquired comic strip according to other algorithms.

The border identifying module 43 is configured for identifying whether there are first borders around the panels within the identified frame. When there are the first borders around the panels within the identified frame, the border identifying module 43 is further configured for identifying whether there are second borders around the panels within the identified frame and the first borders, and repeating the above steps until there are no more borders within the identified frame to be identified.

The panel separating module 44 is configured for separating the number of panels from the acquired comic strip according to the identified first borders and the second borders.

The sorting module 45 is configured for sorting the number of panels. In one embodiment, the sorting module 45 sorts the number of panels in a hierarchical tree structure according to a predetermined rule. The predetermined rule is when the comic strip is horizontally separated into two panels, the sorting module 45 takes the panel above the border as a left node in the tree structure, and takes the panel below the border as a right node in the tree structure; when the comic strip is perpendicularly separated into two panels, the sorting module 43 takes the panel on the left side of the border as a left node in the tree structure, and takes the panel on the right side of the border as a right node in the tree structure.

Figure 3:
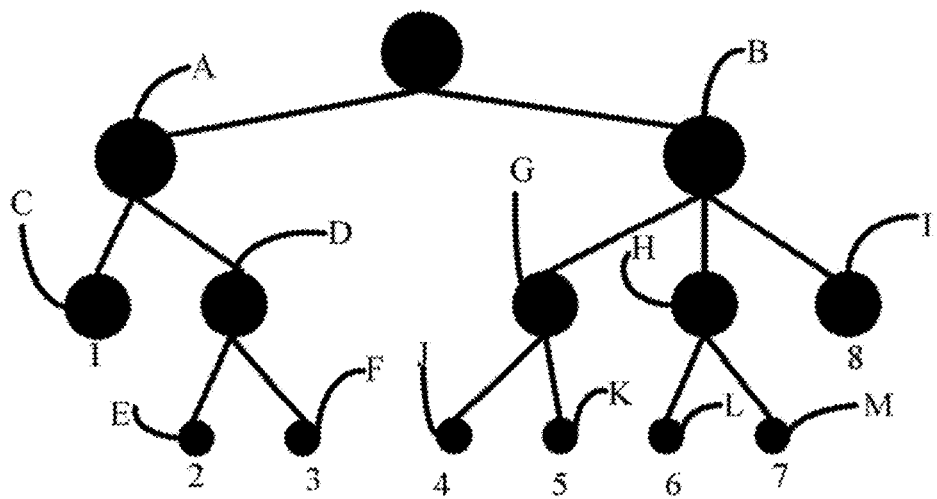
FIG. 3 shows an order of panels of FIG. 2.

As shown in FIG. 3, the comic strip 200 is perpendicularly separated into two panels by the border 31, the sorting module 45 sorts the panel on the left side of the border 31 as a first-level left node A in the tree structure, and sorts the panel on the right side of the border 31 as a first-level right node B in the tree structure. Then, the panel corresponding the first-level left node A is horizontally separated into two panels by the border 37, the sorting module 45 sorts the panel above the border 37 as a second-level left node C in the tree structure, and sorts the panel below the border 37 as a second-level right node D in the tree structure. Then, the panel corresponding to the second-level right node D is perpendicularly separated into two panels by the border 34, the sorting module 45 sorts the panel on the left side of the border 34 as a third-level left node E in the tree structure, and sorts the panel on the right side of the border 34 as a third-level right node F in the tree structure. The panel corresponding to the first-level node B is horizontally separated into three panels by the borders 35 and 36, the sorting module 45 sorts the panel above the border 36 as a second-level left node G in the tree structure, sorts the panel between the border 36 and 35 as a second level middle node H in the tree structure, and sorts the panel below the border 35 as a second-level right node I on the tree structure. Then, the panel corresponding to the second-level left node G is perpendicularly separated into two panels by the border 32, the sorting module 45 sorts the panel on the left side of the border 32 as a third-level left node J in the tree structure, and sorts the panel on the right side of the border 32 as a third-level right node K in the tree structure. Finally, the panel corresponding to the second-level middle node H is perpendicularly separated into two panels by the border 33, the sorting module 45 sorts the panel on the left side of the border 33 as a third-level left node L in the tree structure, and sorts the panel on the right side of the border 33 as a third-level right node M in the tree structure. As shown in FIG. 3, the eight panels 1, 2, 3, 4, 5, 6, 7, and 8 are sorted into the tree structure.

In other embodiments, the processing unit 40 further includes an implementing module 46. The implementing module 46 is configured for performing some operation/s on the panels being selected, such as, zooming in/out, etc.

Figure 4:
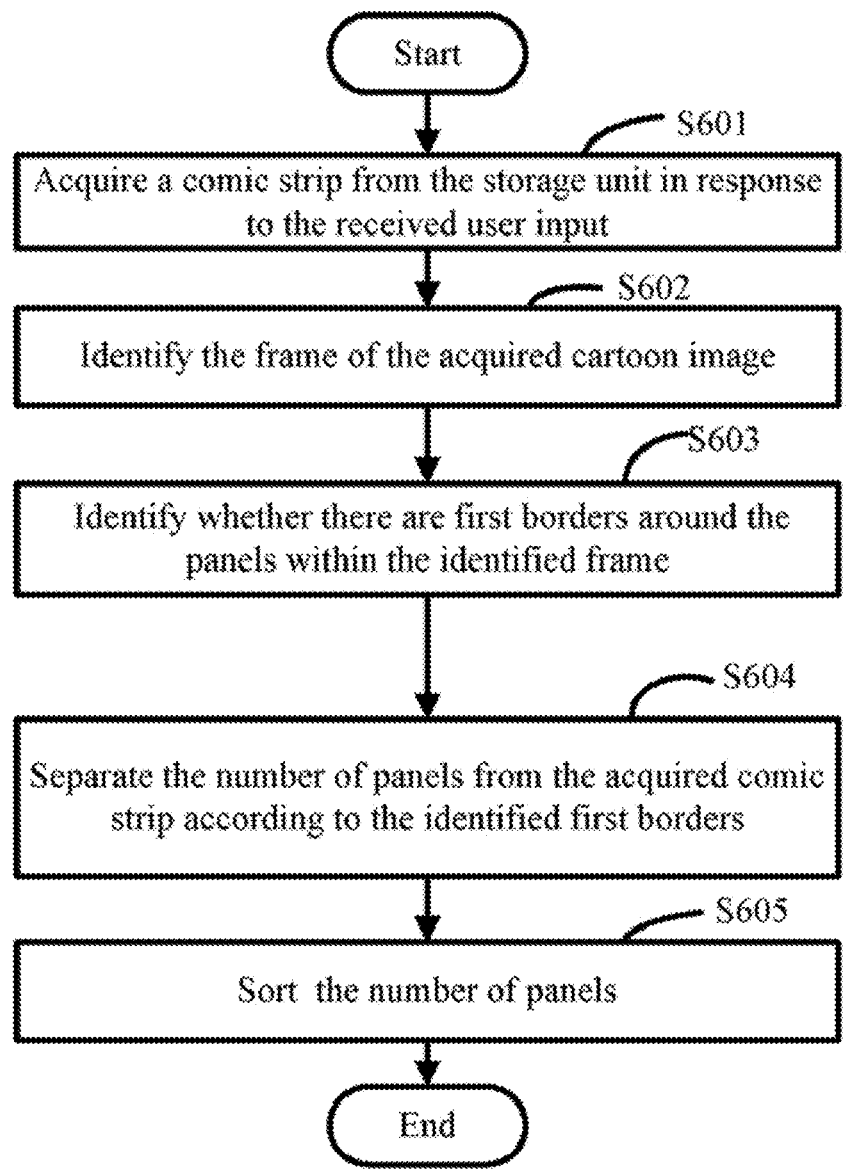
FIG. 4 is a flowchart of a method for separating panels from the comic strip implemented by the electronic device of FIG. 1 in accordance with an exemplary embodiment.

FIG. 4 is a flowchart of a method for separating panels of the comic strips implemented by the electronic device of FIG. 1 in accordance with exemplary embodiment.

In step S601, the comic strip acquiring module 41 acquires a comic strip from the storage unit 20 in response to user input.

In step S602, the frame identifying module 42 identifies the frame of the acquired comic strip.

In step S603, the border identifying module 43 identifies whether there are first borders around the panels within the identified frame.

In step S604, the panel separating module 44 separates the number of panels from the acquired comic strip according to the identified first borders when there are first borders around the panels within the identified frame.

In step S605, the sorting module 45 sorts the number of panels.

In other embodiment, the method further includes the following steps: when there are the first borders around the panels within the identified frame, the border identifying module 43 further identifies whether there are second borders around the panels within the identified frame and the first borders, if yes, the panel separating module 44 separates the number of panels from the acquired comic strip according to the identified second borders, and the sorting module 45 further sorts the number of panels.

In other embodiments, the method further includes the following steps: the implementing module 46 performs some operation/s on the panels being selected (e.g. zoom in, zoom out, cropping).

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device with a function of separating panels of a comic strip, comprising:
    an input unit for receiving user input;
    a storage unit for storing a plurality of comic strips, each comic strip comprising a frame, a plurality of panels within the frame, and a plurality of borders separating the panels; and
    a processing unit comprising:
        a comic strip acquiring module for acquiring a comic strip from the storage unit in response to the received user input from the input unit;
        a frame identifying module for identifying the frame of the acquired comic strip;
        a border identifying module for identifying whether there are first borders around the panels within the identified frame;
        a panel separating module for separating the plurality of panels from the acquired comic strip according to the identified first borders when there are first borders around the panels within the identified frame; and
        a sorting module for sorting the plurality of panels.

2. The electronic device as described in claim 1, wherein when there are the first borders around the panels within the identified frame, the border identifying module is further configured for identifying whether there are second borders around the panels within the identified frame and the first borders, the panel separating module is further configured for separating the plurality of panels from the acquired comic according to the second borders when there are second borders around the panels within the identified frame and the first borders, and the sorting module is further configured for sorting the plurality of panels separated by the identified second borders.

3. The electronic device as described in claim 2, wherein the frame identifying module is configured for identifying the frame of the acquired comic strip via Sobel operator.

4. The electronic device as described in claim 2, wherein the sorting module sorts the plurality of panels into a hierarchical tree structure according to a predetermined rule.

5. The electronic device as described in claim 4, wherein the predetermined rule is defined as when the comic strip is horizontally separated into two panels, the sorting module takes the panel above the first or second borders as a left node in the tree structure, and takes the panel below the first or second borders as a right node in the tree structure; when the comic strip is perpendicularly separated into two panels, the sorting module takes the panel on the left side of the first or second borders as a left node in the tree structure, and takes the panel on the right side of the first or second borders as a right node in the tree structure.

6. The electronic device as described in claim 2, wherein the processing unit further comprises an implementing module for performing some operation/s on the panels being selected in response to the user input from the input unit.

7. A method for separating panels from a comic strip implemented by an electronic device, wherein the electronic device comprises an input unit for receiving user input, and a storage unit for storing a plurality of comic strips, each comic strip comprises a frame, a plurality of panels within the frame, and a plurality of borders separating the panels; the method comprising:
    acquiring a comic strip from the storage unit in response to the received user input from the input unit;
    identifying the frame of the acquired comic strip;
    identifying whether there are first borders around the panels within the identified frame;
    separating the plurality of panels from the acquired comic strips according to the identified first borders when there are the first borders around the panels within the identified frame; and
    sorting the plurality of panels.

8. The method as described in claim 7, further comprising:
    identifying whether there are second borders around the panels within the identified frame and the first borders when there are the first borders around the panels within the identified frame;
    separating the plurality of panels from the acquired comic strip according to the identified second borders when there are second borders around the panels within the identified frame and the first borders; and
    sorting the plurality of panels separated by the identified second borders.

9. The method as described in claim 7, further comprising:
    identifying the frame of the acquired comic strip via Sobel operator.

10. The method as described in claim 8, further comprising:
    sorting the plurality of panels into a hierarchical tree structure according to a predetermined rule.

11. The method as described in claim 10, wherein the predetermined rule is defined as:
    taking the panel above the first or second borders as a left node in the tree structure, and taking the panel below the first or second borders as a right node in the tree structure when the comic strip is horizontally separated into two panels; and
    taking the panel on the left side of the first or second borders as a left node in the tree structure, and taking the panel on the right side of the first or second borders as a right node in the tree structure when the comic strip is perpendicularly separated into two panels.

12. The method as described in claim 7, further comprising:
    performing some operation/s on the panels being selected in response to the user input from the input unit.

* * * * *